US 7,082,306 B2

(12) United States Patent
Himmel et al.

(10) Patent No.: US 7,082,306 B2
(45) Date of Patent: Jul. 25, 2006

(54) APPARATUS AND METHOD FOR MERGING WIRELESS TELEPHONE SERVICE WITH EXISTING WIRED TELEPHONE EQUIPMENT IN A FACILITY

(75) Inventors: Maria Azua Himmel, Yorktown Heights, NY (US); Herman Rodriquez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 09/942,748

(22) Filed: Aug. 30, 2001

(65) Prior Publication Data

US 2003/0045306 A1 Mar. 6, 2003

(51) Int. Cl.
*H04Q 7/20* (2006.01)
(52) U.S. Cl. ............ 455/445; 379/211.01; 455/404.2; 455/433
(58) Field of Classification Search ........... 455/462, 455/74.1, 552, 465, 433, 432.1, 566, 422.1
See application file for complete search history.

(56) References Cited

U.S. PATENT DOCUMENTS 5,454,032 A * 9/1995 Pinard et al. .......... 379/167.05
5,579,379 A 11/1996 D'Amico et al. .......... 379/112
5,724,658 A 3/1998 Hasan .......................... 455/445
5,745,850 A 4/1998 Aldermeshian et al. ..... 455/417
5,796,727 A 8/1998 Harrison et al. ............ 370/338
5,903,833 A 5/1999 Jonsson et al. ............. 455/417
5,953,651 A 9/1999 Lu et al. ..................... 455/408
5,978,672 A 11/1999 Hartmaier et al. .......... 455/413
6,466,799 B1 * 10/2002 Torrey et al. ............... 455/462
6,934,543 B1 * 8/2005 Wang et al. ................ 455/433

FOREIGN PATENT DOCUMENTS

WO    WO 00/51375    8/2000

* cited by examiner

*Primary Examiner*—Fan Tsang
*Assistant Examiner*—Gerald Gauthier
(74) *Attorney, Agent, or Firm*—Duke W. Yee; Mark S. Walker; Francis Lammes

(57) ABSTRACT

An apparatus and method for merging mobile, or wireless, telephone service with existing wired telephone equipment in a facility, such as a home or business, are provided. With the apparatus and method, a converter is associated with the facility such that a wireless telephone number is associated with the converter. Telephone calls may be made to the facility via a wireless telephone network and the converter. The converter receives calls from the wireless telephone network directed to the converter, converts the format of the wireless telephone call to a wired telephone call format, and routes these calls to one or more wired telephone units in the facility. Calls originating from the wired telephone units in the facility are received by the converter which converts the call signals to an appropriate format for wireless network routing, and forwards the call to the wireless network.

23 Claims, 3 Drawing Sheets

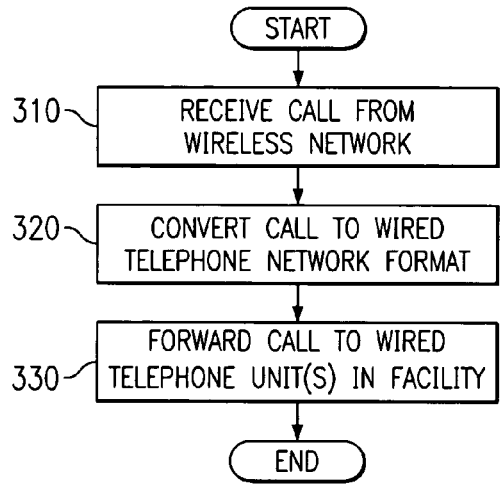
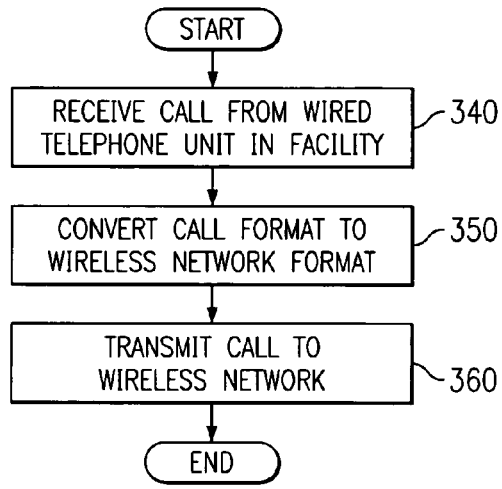
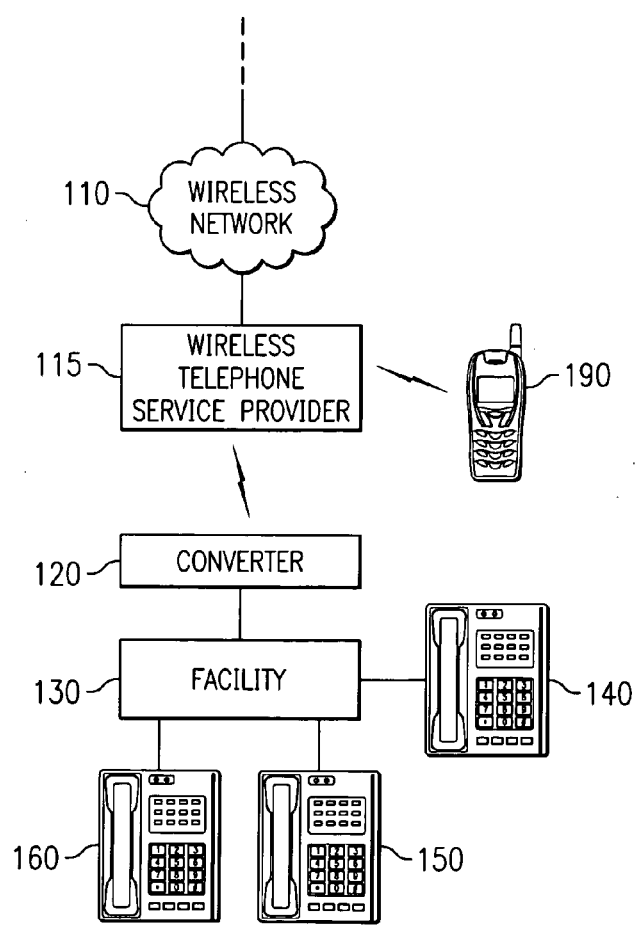

APPARATUS AND METHOD FOR MERGING WIRELESS TELEPHONE SERVICE WITH EXISTING WIRED TELEPHONE EQUIPMENT IN A FACILITY

BACKGROUND OF THE INVENTION

1. Technical Field

The present invention is directed to an apparatus and method for merging wireless telephone service with existing wired telephone equipment in a facility.

2. Description of Related Art

Mobile, also called wireless, telephones are becoming more prevalent in today's society. Many households have at least one mobile telephone and many businesses now issue wireless telephones to their employees. However, the mobile phone and phones used within the home or business facilities are rarely the same. Moreover, the mobile phone typically has a different telephone number than the telephones in the home or business facilities. For example, a telephone service subscriber may have a first telephone number assigned to the land-line telephones in his/her home and a second telephone number assigned to his/her mobile telephone.

Thus, telephone service subscribers must pay for two separate telephone subscriptions and cope with having two different telephone numbers. Furthermore, the persons that will attempt to contact the subscriber must be made aware of both telephone numbers and often must try both telephone numbers when attempting to contact the subscriber.

Many subscribers would prefer to use their mobile telephones everywhere and discontinue their subscriptions to wired telephone service. There are many reasons why users may prefer to use their mobile telephones. First, many services that have extra fees associated with them in a wired telephone service are free with mobile telephone service subscriptions, including CallerID and VoiceMail. Second, the cost of usage may, depending on the mobile telephone service subscription plan, be less than that of wired service.

On the other hand, with wired telephone service, many wired telephones may be connected and use the same telephone number with no additional cost. In addition wire telephone units are typically cheaper than mobile telephones (unless they are purchased through special incentive offers provided by mobile telephone service providers). Thus, it would be beneficial to have an apparatus and method for merging mobile telephone service with existing wired telephone service equipment in facilities.

SUMMARY OF THE INVENTION

An apparatus and method for merging mobile, or wireless, telephone service with existing wired telephone equipment in a facility, such as a home or business, are provided. With the apparatus and method, a converter is associated with the facility such that a wireless telephone number is associated with the converter. Telephone calls may be made to the facility via a wireless telephone network and the converter.

The converter receives calls from the wireless telephone network directed to the converter, converts the format of the wireless telephone call to a wired telephone call format, and routes these calls to one or more wired telephone units in the facility. Calls originating from the wired telephone units in the facility are received by the converter which converts the call signals to an appropriate format for wireless network routing, and forwards the call to the wireless network.

In an alternative embodiment, a single telephone number may be associated with a converter and with one or more wireless telephones. When a call is received and is directed to the telephone number, the telephone call is routed to both the wireless telephone and the converter. The converter operates in the same manner as in the previous embodiment. The wireless telephone operates in a normal fashion. The telephone that first answers the call receives the call signals and the routing of the call to the other telephones is discontinued.

In addition, the wireless telephone may be equipped with a location determination device that determines the wireless telephone's geographic location. This geographic location may be reported to the wireless service provider. When a call is received for the telephone number associated with the wireless telephone and the converter, a check is made to determine if the last reported location of the wireless telephone was the location of the facility associated with the converter. If the last reported location was the same as the facility location, calls are not routed to the wireless telephone and are only routed to the wired telephone units via the converter.

Alternatively, telephone calls may be routed to both the converter and the wireless telephone. In such an embodiment, both the converter and the wireless telephone have an electronic ID (EID), mobile identification number (MIN), or the like. A single telephone number will have the two EIDs associated with it. When a call is placed to the telephone number, the call will be sent to both EIDs and thus, both the converter and the wireless telephone. Other features and advantages of the invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is a flowchart outlining an exemplary operation of the present invention when receiving a call from a wireless network;

FIG. 3B is a flowchart outlining an exemplary operation of the present invention when receiving a call from a facility wired telephone;

FIG. 4 is an exemplary block diagram illustrating a telephone network in accordance with a second exemplary embodiment of the present invention;

DETAILED DESCRIPTION OF THE PREFERRED EMBODIMENT

Figure 1:
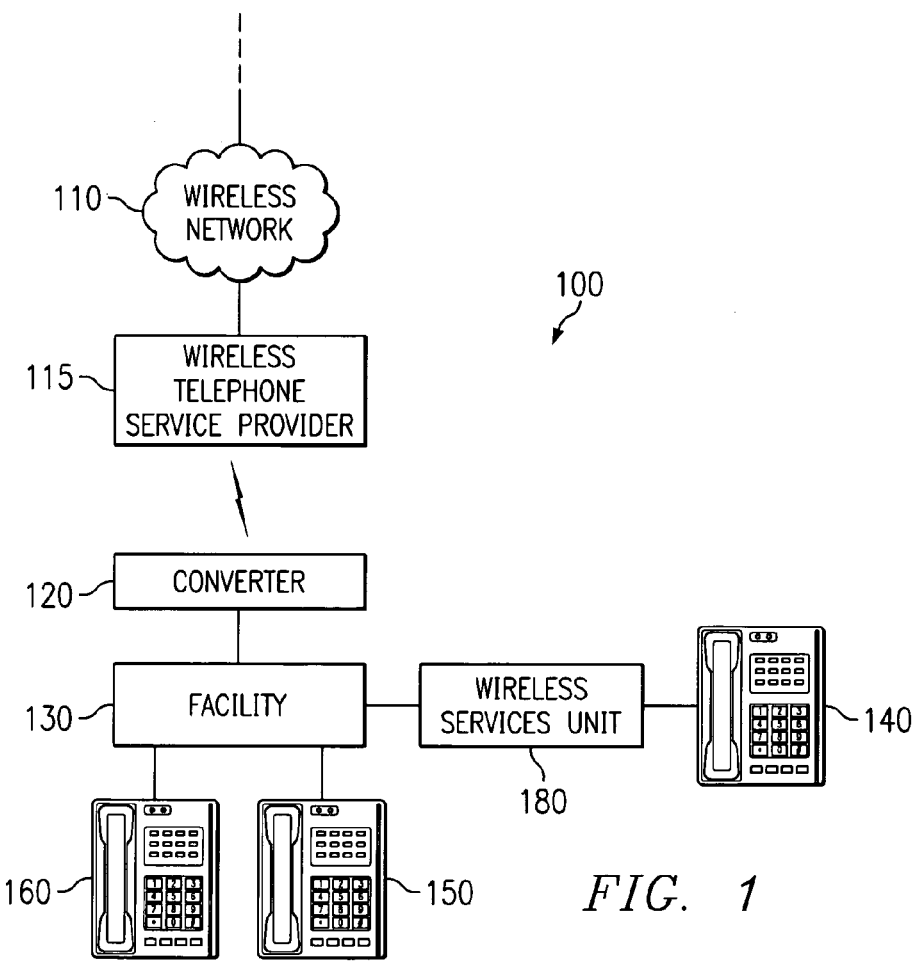
FIG. 1 is an exemplary block diagram illustrating a telephone network according to the present invention.

FIG. 1 is an exemplary block diagram of a telephone network in accordance with the present invention. As shown in FIG. 1, the telephone network 100 includes a wireless network 110, a wireless service provider 115, a converter 120 and a facility 130 having one or more wired telephone units 140–160. The wireless network 110 may be a cellular network, satellite network, infrared network, Bluetooth™ network, or the like. The wireless network 110 may include a plurality of routers, switches, base stations, and the like. Moreover, the wireless network 110 may include one or more wireless networks of the same or different types. The wireless network 110 operates in the same manner as generally known in the art.

The wireless service provider 115 provides wireless telephone services to the facility 130 via the converter 120. The wireless service provider 115 may operate in the same manner as generally known in the art with regard to providing wireless telephone service to wireless telephone devices. In the present invention, the converter 120 is considered a wireless telephone device by the wireless service provider 115 and thus, the wireless service provider 115 routes wireless telephone calls to the converter 120 in much the same way that known wireless service providers route wireless telephone calls to wireless telephone devices.

In an alternative embodiment, as described in more detail hereafter, the wireless telephone service provider may have its operation modified from that generally known of existing wireless telephone service providers, such that the wireless telephone service provider determines whether to route wireless telephone calls to a wireless telephone unit and/or the converter 120 based on its current location.

The converter 120 couples the wireless network 110 to the facility 130 and facilitates the merging of wireless telephone service with the wired telephone equipment in the facility 130. The converter 120 converts wireless call signals received from the wireless telephone service provider 115 into a format useable by the wired telephone units 140–160 associated with the facility 130. The converter 120 then routes the call to the wired telephone units 140–160.

Conversely, the converter 120 may receive telephone call signals from wired telephone units 140–160 and convert them to a wireless network format. The converter 120 may then route the call signals to the wireless telephone service provider 115 for routing through the wireless network 110 to the designated destination.

When a call is received by the converter 120 from the wireless network 110, the call is converted to a format usable by wired telephone devices 140–160. Such conversion is performed in a manner generally known in the art for sending mobile telephone calls to land-line telephones. The conversion may include converting signaling protocols used by the wireless network to signaling protocols used by wired networks, for example. In the present case, however, the call is not routed through an external wired telephone network to arrive at the facility telephone units 140–160 but rather, is routed to the converter 120 via the wireless network 110 and then from the converter 120 to the wired telephone units 140–160.

Once the converter 120 converts the call to a wired telephone network protocol, the converter 120 forwards the call to one or more of the wired telephone units 140–160 associated with the facility 130. Such forwarding causes the wired telephone units 140–160 to which the call is forwarded to ring to thereby notify persons nearby that a telephone call is available to be received.

In this way, the wired telephone units 140–160 are operated in a normal fashion as if the call were routed through a wired telephone network. Thus, the recipient of telephone call is not aware of any difference in the telephone service call that they receive. Similarly, the calling party places a call in the same fashion as they would without the presence of the present invention. The present invention operates as a bridge between the wireless network 110 and the facility 130 such that telephone service may be provided by a wireless telephone service provider to a wired telephone in the facility 130 with little if any difference in the operating experience of the caller and the call recipient.

In addition to the above, in forwarding the call to the wired telephone units 140–160, any special telephone services subscribed to by the wireless subscriber at the facility 130 will be provided in the forwarding of the call. Thus, for example, if the subscriber's wireless telephone service subscription includes a voicemail service and a caller ID service, such services will be provided to the wired telephone units 140–160, assuming the wired telephone units 140–160 are equipped to make use of such services. As a result, many services that do not require an additional charge in the mobile telephone service subscription are provided to wired telephone units without requiring an additional cost.

If the wired telephone units 140–160 are not equipped to make use of the wireless telephone services, the wired telephone units may be provided with a separate device coupled to the wired telephone unit 140–160 that provides the necessary functionality. For example, as shown in FIG. 1, the wired telephone unit 140 may be provided with a wireless services unit 180 that provides one or more interfaces, circuitry, and applications for providing wireless telephone services to the wired telephone unit 140. Thus, when the converter 120 forwards the call to the wired telephone unit 140, the call is passed through the wireless services unit 180 which provides any wireless services identified in the call signals. Thus, even wired telephone units that are not equipped to handle wireless telephone services may be provided with these services with the aid of an additional hardware unit.

When placing an outbound call, a calling party may make use of a wired telephone unit 140–160 in the facility 130 in a normal manner. The calling party dials the telephone number and awaits being connected to the called party. The converter 120 receives the initiation call signals from the wired telephone unit and converts them to a format useable with the wireless telephone network 110. The converter 120 then forwards the call to the wireless network 110 which then routes the call in a normal fashion to the destination telephone unit (either wired or wireless).

Moreover, while the present invention is being described in terms of a single telephone number being associated with the converter 120, the present invention is not limited to such. Rather, multiple telephone numbers may be associated with a single converter 120. This may be the case in a business type facility 130, where there may be a plurality of different offices or the like, each may have their own telephone number.

In such a case, the wireless service provider 115 will route all calls to any of the telephone numbers associated with the facility 130 to the converter 120. The converter 120 may then store a table identifying which wired telephone units 140–160 correspond to different destination telephone numbers. Based on the destination telephone number of the call that was received, as may be determined, for example, based on header information or header signals, the converter 120 may identify the appropriate destination wired telephone unit 140–160 to which the call should be forwarded. The call is then forwarded to the wired telephone unit 140–160 based on this table look-up.

Figure 2:
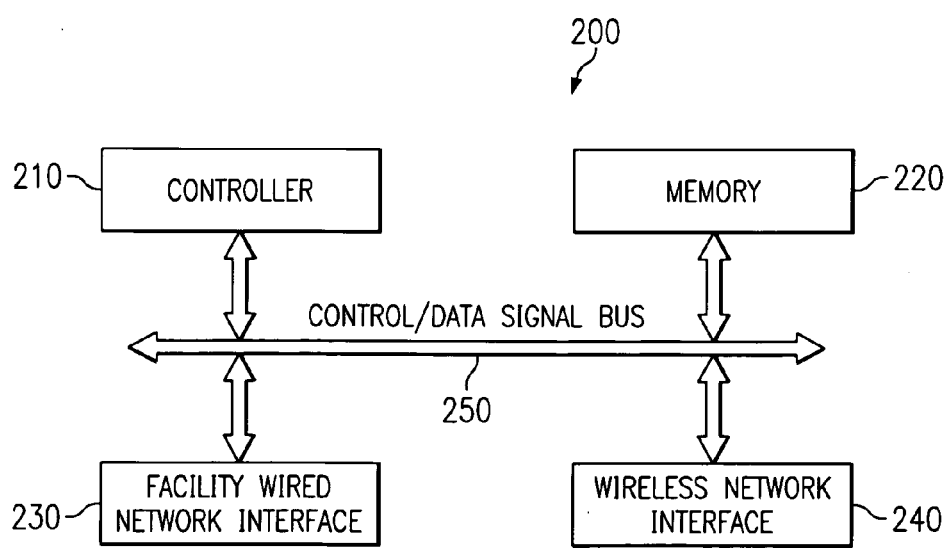
FIG. 2 is an exemplary diagram illustrating a wireless to wired telephone converter according to the present invention.

FIG. 2 is an exemplary block diagram of a converter according to the present invention. As shown in FIG. 2, the converter 200 includes a controller 210, a memory 220, a facility wired network interface 230, and a wireless network interface 240. The elements 210–240 are coupled to one another via the control/data signal bus 250. Although a bus architecture is shown in FIG. 2, the present invention is not limited to such and any architecture that facilitates the communication of control/data signals among the elements 210–240 may be used without departing from the spirit and scope of the present invention.

The controller 210 controls the overall operation of the converter 200 based on control programs stored in the memory 220. The controller 210 operates to convert calls from a mobile network format to a wired telephone format, and vice versa, so that calls may be made to and from the wired telephone units associated with the facility to which the converter 200 is assigned. In addition, the controller 210 may use a lookup table in the memory 220 to identify to which one of the wired telephone units to forward the call based on the destination telephone number of the received call.

The facility wired network interface 230 provides a communication interface for sending and receiving calls to and from wired telephone units associated with the facility. The wireless network interface 240 provides a communication interface for sending and receiving calls to and from wireless telephone units via the wireless network 110, for example. The wireless network interface 240 may include, for example, a transceiver through which calls are sent and received in a wireless manner.

In addition to providing a gateway through which calls to a wireless telephone number may be routed to land-line telephones in a facility, the converter of the present invention may also keep track of the calls to and from each existing wired telephone, keep track of which telephone in the building the call was sent to or from, store telephone preferences for each wired telephone, user preferences for each user of the wired telephones, store data regarding the telephone capabilities, maintain billing records, and the like. The converter may be provided with data storage devices and applications for providing these functions.

FIG. 3A is a flowchart outlining an exemplary operation of the present invention when receiving a call from a wireless network. As shown in FIG. 3A, the operation starts with the receipt of a call from a wireless network device (step 310). The call is converted from the wireless network format to a wired network format (step 320) and then routed to one or more of the wired telephone units in the facility (step 330). Such routing of the call to a wired telephone unit in the facility may include a table look-up based on the destination telephone number as previously described.

FIG. 3B is a flowchart outlining an exemplary operation of the present invention when transmitting a call received from a wired telephone unit associated with the facility. As shown in FIG. 3B, the operation starts with receiving a call from a wired telephone unit in the facility destined for an outside telephone number (step 340). The format of the call is converted from a wired telephone network format to a wireless network format (step 350) and the call is transmitted to the wireless network (step 360). The call is then routed through the wireless network in a normal fashion until it reaches the destination telephone unit (either wired or wireless).

Thus, the present invention provides an apparatus and method by which telephone calls may be routed to wired telephone units via a wireless network without the need for an external wired telephone network. By virtue of the present invention, wireless calls are routed directly to the facility to which the calls are destined. A converter in the facility then routes the call to an appropriate wired telephone unit. Thus, the facility owner/operator need only have one telephone service provider, i.e. the wireless telephone service provider. Moreover, the facility owner/operator may make use of many of the financial benefits of wireless networks, such as free voicemail and caller ID services, and reduced costs due to having a single telephone service provider.

As a further embodiment of the present invention, the functionality of the present invention may be extended such that both wired and wireless telephones may be associated with the facility, and the present invention may discern when to route calls to the wired or the wireless telephones. FIG. 4 is an exemplary block diagram of a wireless network in accordance with this further embodiment. The elements in FIG. 4 are the same as those in FIG. 1 with the exception that a wireless telephone unit 190 is associated with the facility 130.

The wireless telephone unit 190 may be carried by a user outside the location of the facility 130. In one embodiment of the present invention, calls to a telephone number associated with the converter 120 may be routed to the wireless telephone unit 190 in a similar manner as that described above with regard to FIG. 1. The difference here is that since the telephone unit 190 is wireless, the forwarding of the call to the wireless telephone unit 190 does not require conversion of the call to a wired telephone network format. Further, the call is forwarded using the wireless network 110 rather than the facility wired network interface 230.

In an alternative embodiment, the wireless telephone service provider 115 may transmit the call to both the converter 120 and the wireless telephone unit 190 rather than relying on the converter 120 to forward the call to the wireless telephone unit 190. Such functionality requires the wireless telephone service provider 115 to maintain in its database an identifier of the converter and the wireless telephone unit 190 such that it can transmit a call signal to both units. For example, as single telephone number may have two or more different telephone unit identifiers associated with it, e.g., a first telephone identifier for the converter 120 and a second telephone identifier for the wireless telephone unit 190. When a call is placed to the telephone number, the call is routed to both the converter 120 and the wireless telephone unit 190. The first telephone unit to answer the call will have the call forwarded to it.

In yet a further embodiment of the present invention, the wireless telephone unit 190 may be equipped with a location determination device, such as a Global Positioning System (GPS), Loran, or the like. The wireless telephone unit 190 may periodically report its current position to the wireless telephone service provider 115 which updates the current position in a database.

When a call is received for the wireless telephone unit 190, the wireless telephone service provider 115 first checks the last reported current position against a geographical location database to determine whether the wireless telephone unit 190 is in the same location as the facility 130. If not, the call is forwarded to the wireless telephone unit 190.

If it is in the same location, the call is forwarded to one of an appropriate wired telephone unit in the facility 130 only via the converter 120, or both the wired telephone unit and the wireless telephone unit 190. The decision whether to send to one or the other is purely implementation specific, and may be user selectable.

Figure 5:
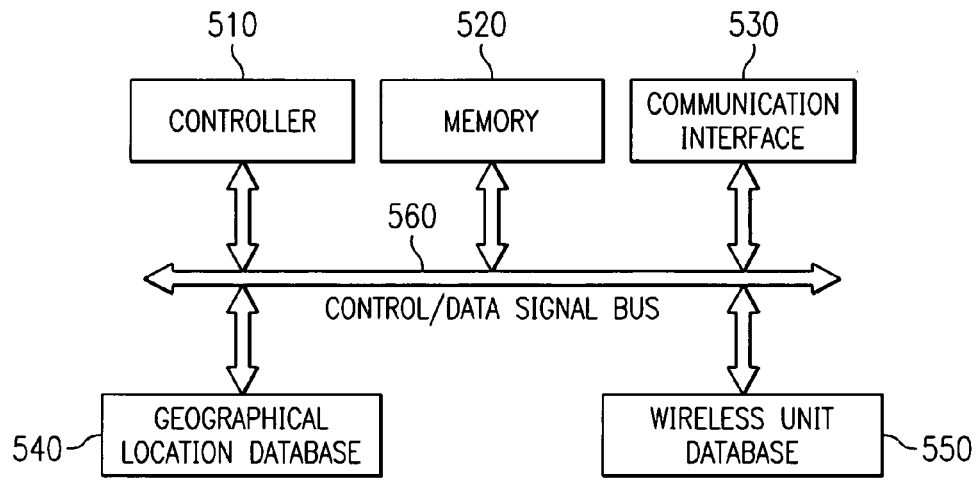
FIG. 5 is an exemplary block diagram of a wireless service provider according to the second exemplary embodiment.

In these alternative embodiments, the converter 120 is the same as shown in FIG. 2, however the wireless telephone service provider has additional functionality than that of standard wireless telephone service providers. FIG. 5 is an exemplary block diagram illustrating the primary operational components of the wireless telephone service provider according to these alternative embodiments.

As shown in FIG. 5, the wireless telephone service provider includes a controller 510, a memory 520, a communication interface 530, a geographical location database 540, and a wireless unit database 550. These elements 510–550 are coupled to one another via the control/data signal bus 560. Although a bus architecture is shown in FIG. 5, the present invention is not limited to such and any architecture that facilitates the communication of control/data signals among the elements 510–550 may be used without departing from the spirit and scope of the present invention.

The controller 510 controls the overall operation of the wireless telephone service provider and orchestrates the operation of the other elements 520–550. The controller 510 may operate based on control programs stored in memory 520, for example. The controller 510 controls the routing of calls to the wireless telephone units and the converters associated with facilities via the interface 530.

The geographical location database 540 stores geographical location information for various facilities registered with the wireless telephone service provider. Such geographical location information may include, for example, geographical coordinates of the facilities, their identifications, associated telephone numbers, and the like.

The wireless unit database 550 stores information regarding the various wireless units that are currently under the supervision of the wireless telephone service provider. Such information may include identifications of the wireless units (this includes converters), associated telephone numbers, last reported current geographical locations, and the like.

In one of the alternative embodiments, when a call is received for a wireless telephone unit, the wireless telephone service provider compares the last reported current location from the wireless unit database 550 to the geographical location information stored in the geographical location database 540 to determine if the last reported location coincides with the geographical location of the facility with which the wireless telephone unit is associated. If so, the call may be routed to one or more of an appropriate wired telephone unit in the facility via the converter, and the wireless telephone unit.

Figure 6:
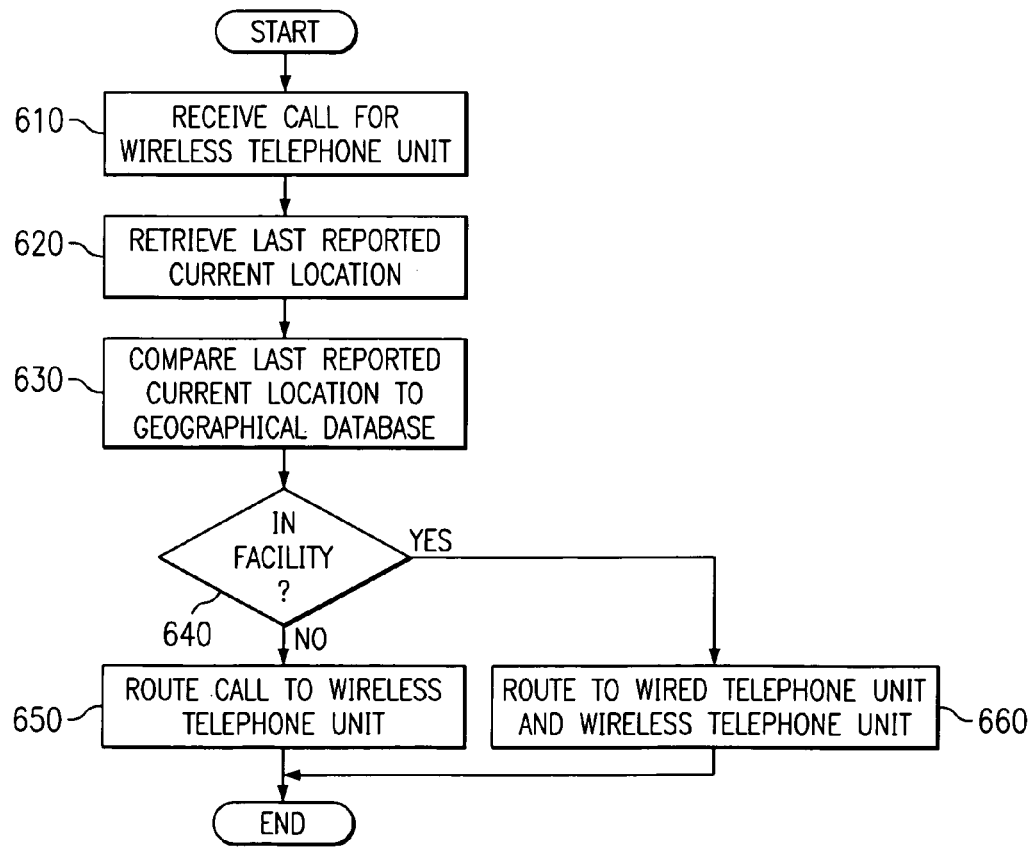
FIG. 6 is a flowchart outlining an exemplary operation of the second exemplary embodiment of the present invention.

FIG. 6 is a flowchart outlining an exemplary operation of a wireless telephone service provider according to this alternative embodiment. As shown in FIG. 6, the operation starts with receipt of a call destined for a wireless telephone unit associated with a facility (step 610). The wireless telephone service provider retrieves a last reported current location for the destination wireless telephone unit (step 620). The last reported current location is then compared to location information in the geographical location database (step 630). A determination is then made as to whether the wireless telephone unit is in the same location as the facility (step 640). If not, the call is routed to the wireless telephone unit (step 650). If so, the call is routed to the converter 120 and thereby to one or more of an appropriate wired telephone units in the facility. The call may also be routed to the wireless telephone unit (step 660).

Thus the present invention provides a mechanism by which telephone calls may be sent to wired telephones directly from a wireless network without first going through a wired telephone network. While the present invention provides such functionality, this does not preclude the wired telephones from also receiving calls from other wired telephone devices via a wired telephone network. In other words, the present invention may operate in conjunction with wired telephone networks although the present invention itself does not make use of these wired telephone networks.

It is important to note that while the present invention has been described in the context of a fully functioning call processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention and their practical application, and to enable others of ordinary skill in the art to understand the invention for various embodiments with various modifications as are suited to the particular use contemplated.

What is claimed is:

1. A method of routing calls to wired telephone devices in a facility, comprising:
   receiving a call directly from a wireless network;
   converting the call to a wired telephone network format;
   forwarding the call to a wired telephone device without routing the call through a wired telephone network external to the facility;
   determining a location of a wireless telephone device associated with the facility; and
   routing the call to the wireless telephone device based on the location of the wireless telephone device, wherein the call is routed to the wireless telephone device only when the location of the wireless telephone device is not a location within the facility.

2. The method of claim 1, further comprising routing the call to both the wired telephone device and a wireless telephone device.

3. The method of claim 1, wherein the call has one or more associated wireless telephone services, and wherein the one or more associated wireless telephone services are provided through the wired telephone device.

4. The method of claim 3, wherein the wired telephone device includes a wireless service unit that provides one or more interfaces for providing the one or more wireless telephone services to a user of the wired telephone device, wherein the services are services a wireless user has subscribed to receive.

5. The method of claim 1, wherein the call has an associated address, and wherein forwarding the call to a wired telephone device includes looking up the associated address in a directory of wired telephone devices associated with the facility, wherein the associated address is a geographic location of the facility and wherein determining if the last reported location of the wireless telephone device coincides with the geographical location of the facility with which the wireless telephone unit is associated.

6. The method of claim 1, further comprising storing tracking information for the wired telephone device.

7. The method of claim 6, wherein the tracking information includes one or more of records of calls made to or from the wired telephone device, wired telephone device preferences, wired telephone capabilities, user preferences for a user of the wired telephone device, and billing records for the wired telephone device.

8. The method of claim 2, wherein a telephone number associated with the call has an associated identifier for the wired telephone device and an associated identifier for the wireless telephone device, and wherein the call is routes to the wired telephone device and the wireless telephone device based on the associated identifiers.

9. The method of claim 1, further comprising:
determining when to route the calls to the wired or wireless telephones associated with the facility; and
routing the call based upon the determination.

10. An apparatus for routing calls to wired telephone devices in a facility, comprising:
a facility wired network interface;
a wireless network interface; and
a controller coupled to both the facility wired network interface and the wireless network interface, wherein the controller receives a call directly from a wireless network via the wireless network interface, converts the call to a wired telephone network format, forwards the call to a wired telephone device via the facility wired network interface without routing the call through a wired telephone network external to the facility; determines a location of a wireless telephone device associated with the facility; and routes the call to the wireless telephone device based on the location of the wireless telephone device, wherein the controller routes the call to the wireless telephone device only when the location of the wireless telephone device is not a location within the facility.

11. The apparatus of claim 10, wherein the controller routes the call to both the wired telephone device and a wireless telephone device.

12. The apparatus of claim 10, wherein the call has an associated address, and wherein the controller forwards the call to a wired telephone device by looking up the associated address in a directory of wired telephone devices associated with the facility, wherein the associated address is a geographic location of the facility and wherein determining if the last reported location of the wireless telephone device coincides with the geographical location of the facility with which the wireless telephone unit is associated.

13. The apparatus of claim 10, further comprising a storage device that stores tracking information for the wired telephone device.

14. The apparatus of claim 13, wherein the tracking information includes one or more of records of calls made to or from the wired telephone device, wired telephone device preferences, wired telephone capabilities, user preferences for a user of the wired telephone device, and billing records for the wired telephone device.

15. The apparatus of claim 11, wherein a telephone number associated with the call has an associated identifier for the wired telephone device and an associated identifier for the wireless telephone device, and wherein the controller routes the call to the wired telephone device and the wireless telephone device based on the associated identifiers.

16. The apparatus of claim 10, wherein the controller determines when to route the calls to the wired or wireless telephones associated with the facility; and routes the call based upon the determination.

17. A computer program product in a computer readable medium for routing calls to wired telephone devices in a facility, comprising:
first instructions for receiving a call directly from a wireless network;
second instructions for converting the call to a wired telephone network format;
third instruction for forwarding the call to a wired telephone device without routing the call through a wired telephone network external to the facility;
fourth instructions for determining a location of a wireless telephone device associated with the facility; and
fifth instructions for routing the call to the wireless telephone device based on the location of the wireless telephone device, wherein the call is routed to the wireless telephone device only when the location of the wireless telephone device is not a location within the facility.

18. The computer program product of claim 17, further comprising sixth instructions for routing the call to both the wired telephone device and a wireless telephone device.

19. The computer program product of claim 17, wherein the call has one or more associated wireless telephone services, and wherein the one or more associated wireless telephone services are provided through the wired telephone device.

20. The computer program product of claim 17, wherein the call has an associated address, and wherein the third instructions for forwarding the call to a wired telephone device include instructions for looking up the associated address in a directory of wired telephone devices associated with the facility, wherein the associated address is a geographic location of the facility and wherein determining if the last reported location of the wireless telephone device coincides with the geographical location of the facility with which the wireless telephone unit is associated.

21. The computer program product of claim 17, further comprising sixth instructions for storing tracking information for the wired telephone device.

22. The computer program product of claim 21, wherein the tracking information includes one or more of records of calls made to or from the wired telephone device, wired telephone device preferences, wired telephone capabilities, user preferences for a user of the wired telephone device, and billing records for the wired telephone device.

23. The computer program product of claim 17, further comprising:
sixth instructions for determining when to route the calls to the wired or wireless telephones associated with the facility; and
seventh instructions for routing the call based upon the determination.

* * * * *